United States Patent [19]

Katagiri

[11] 4,454,190
[45] Jun. 12, 1984

[54] EXPANDABLE CERAMIC FIBER FELT WITH GRAPHITE FLAKES

[75] Inventor: Masayuki Katagiri, Toyokawa, Japan

[73] Assignee: Isolite Babcock Refractories Co., Ltd., Aichi, Japan

[21] Appl. No.: 419,346

[22] Filed: Sep. 17, 1982

[30] Foreign Application Priority Data

Sep. 29, 1981 [JP] Japan ................................. 56-154146

[51] Int. Cl.$^3$ .............................................. D04H 1/08
[52] U.S. Cl. .................................... 428/281; 162/158; 162/181.9; 428/283; 428/323; 428/402; 428/367; 428/408; 428/910; 428/913
[58] Field of Search ............... 428/281, 283, 323, 402, 428/367, 408, 910, 913; 162/158, 181 R

[56] References Cited

U.S. PATENT DOCUMENTS 4,291,166  10/1981  Ogino ................................. 428/281

*Primary Examiner*—Marion McCamish
*Attorney, Agent, or Firm*—Robert J. Edwards; J. Henry Muetterties; Mark B. Quatt

[57] ABSTRACT

An expandable ceramic fiber felt to be used as a insulating material comprising ceramic refractory fibrous material, about 2 to 20 weight percent of expandable graphite flakes, and an organic binder. The graphite flakes expand upon heating thereby causing the ceramic fiber felt to expand to fill the gap of an expansion joint or seal of a furnace wall.

2 Claims, No Drawings

EXPANDABLE CERAMIC FIBER FELT WITH GRAPHITE FLAKES

BACKGROUND AND SUMMARY OF INVENTION

The present invention relates to expandable ceramic fiber felt and a manufacturing process for making the same.

Ceramic refractory fibrous materials of the alumina-silica, alumina and zirconia type have been used for thermal insulation for many years. The usual fiber is commercially manufactured by a jet of air or steam shattering a stream of molten ceramic with the so formed fibers collected in bulk form. Ordinarily, the collector bulk fiber is compressed to form fiber blankets or sheets of a preferred bulk density. Felt pads of ceramic fibers can be formed and used at high-temperature heat insulating material as well. These felt pads are inserted into the gaps of expansion joints or seals of furnace walls.

Conventional expandable ceramic fiber felt with vermiculite incorporated therein has been found to be an ineffective insulator because the vermiculite withstand only up to 1100° C., whereas the ceramic fibers alone withstand a temperature greater than 1260° C. Furthermore the vermiculite reacts with the ceramic fibers at elevated temperature decreasing the heat resistance of the fibers.

It is the object of this invention to provide an expandable ceramic fiber felt which expands upon heating.

According to this invention, this object is achieved by an expandable ceramic fiber felt which is comprised of ceramic fiber, expandable graphite flakes, and an organic binder.

The graphite flakes which expand upon heating are produced by treating natural graphite flakes with an oxidizing agent such as a mixture of sulfuric acid and nitric acid, followed by a water rinse. The natural graphite flakes then form openings between the networks of carbon atom layers and pass to expandable graphite flakes which expand in the laminated direction when heated to 350° to 600° C. The flakes are uniformly dispersed in the ceramic fiber felt in such a manner that the greater surface area of the graphite flake is parallel to the orientated direction of the ceramic fibers. The graphite flakes are present in amounts of about 2 to 20 weight percent based on the total weight of the ceramic fibers and graphite flakes.

DETAILED DESCRIPTION OF THE INVENTION

According to the present invention, expandable graphite flakes are incorporated into the ceramic fiber felt in such a manner that the larger surface of the graphite flake is parallel with the oriented direction of the ceramic fibers which is perpendicular to the thickness direction. Such arrangement of graphite flakes permits the felt to expand effectively in the thickness direction only. When such felt is heated to 800° C. (1472° F.) in an oxidizing atmosphere, the graphite burns completely, without having an adverse effect on the ceramic fibers. The expansion of the ceramic fiber felt can be accomplished with a small quantity of treated graphite flakes. The treatment consists of treating the flakes with an oxidizing agent such as a mixture of sulfuric acid and nitric acid, followed by a water rinse. The heat resistance and insulating performance of the ceramic fibers can be fully utilized because the graphite flakes burn completely at a high temperature. Once the expandable graphite flakes have burned out, the ceramic fiber felt has expanded to the extent necessary to fill the gap it was inserted into.

The expandable graphite flakes are added in an amount from 2 to 20 wt%, based on total quantity of the ceramic fibers and graphite. Under 2 wt%, little expansion is obtained, and over 20 wt%, no increase in expansion is realized.

The expandable graphite flakes would have an average particle size (in terms of the greater surface) from 0.5 to 2 mm, preferably about 1 mm. Flakes smaller than 0.5 mm are difficult to arrange in parallel alignment with the oriented direction of the ceramic fibers when the felt is made. On the other hand, flakes larger than 2 mm are difficult to disperse uniformly within the felt.

Since there is no binding power between the ceramic fibers and the expandable graphite flakes, they may disintegrate when handled. According to this invention, such trouble is prevented by adding an organic binder which softens at the temperature at which the expandable ceramic felt begins to expand. This organic binder should soften, at a minimum of about 350° C., or at which temperature the expandable graphite flakes begin to expand, so that the expansion of the felt is not prevented by the binder. Most organic binders evaporate and/or burn at temperatures up to 300° C. Organic binders that can be used in this invention include latex, glue, pine resin, methyl cellulose, polyvinyl alcohol, and other synthetic resins. The organic binder may be added to the slurry of ceramic fibers during the wet felt making process, or incorporated into the felt by spreading or dipping after the felt is made by the blowing process.

The ceramic felt of this invention must be produced by wet process or dry process; but the wet process is preferable because of the ease of uniform, oriented distribution of the graphite flakes in the ceramic fibers. The total amounts of graphite flakes and the ceramic fiber in the slurry should be less than 3 wt% for satisfactory orientation of graphite flakes and ceramic fibers.

The invention is described with reference to the examples that follow.

Alumina-silica ceramic fibers (sold under the trade name KAOWOOL by The Babcock & Wilcox Company) and expandable graphite flakes (about 1 mm) in amounts as specified in the following table were dispersed in 1000 kg of water. An aqueous emulsion of latex, i.e. polyacrylate (45% solids) was added in an amount of 0.30 kg, and then an aqueous solution of aluminum sulfate was added until the latex coagulates completely. Felt samples, measuring 300×300×20 mm and having a dried density of 0.2 g/cm$^3$, were prepared by vacuum forming the slurry.

The felt samples were measured for dimensional change that occurred after heating for 24 hours at 800° C. and 1000° C. The results are shown in the following table. It is noted that effective expansion in the thickness direction with no expansion in the longitudinal direction was obtained once graphite flakes were added in amounts greater than 2 wt%.

| Sample No. | Weight of Ceramic Fibers (Kg) | Weight of Expandable Graphite (Kg) | Weight % of Graphite in Sample (%) | Dimensional change at 800° C. | | Dimensional change at 1000° C. | |
|---|---|---|---|---|---|---|---|
| | | | | Thickness Direction (%) | Lengthwise Direction (%) | Thickness Direction (%) | Lengthwise Direction (%) |
| 1 | 2.00 | 0.00 | 0 | +21 | 0 | +16 | 0 |
| 2 | 1.96 | 0.04 | 2 | +50 | 0 | +45 | 0 |
| 3 | 1.90 | 0.10 | 5 | +88 | 0 | +79 | 0 |
| 4 | 1.82 | 0.18 | 9 | +142 | 0 | +137 | 0 |
| 5 | 1.74 | 0.26 | 13 | +180 | 0 | +160 | 0 |
| 6 | 1.67 | 0.33 | 16.5 | +194 | 0 | +172 | 0 |
| 7 | 1.60 | 0.40 | 20 | +201 | 0 | +179 | 0 |

The embodiments of the invention in which an exclusive property or privilege is claimed are defined as follows:

1. An expandable ceramic fiber felt comprises (a) ceramic fiber; (b) expandable graphite flakes having an average particle size from 0.5 to 2 millimeters uniformly dispersed in the ceramic fiber felt in such a manner that the greater surface area of the graphite flakes is parallel to the orientated direction and perpendicular to the thickness direction of the ceramic fiber, said graphite flakes present in amounts of about 2-20 weight percent based on the total weight of the ceramic fiber and graphite flakes, and (c) an organic binder which softens at the temperature at which the expandable ceramic felt begins to expand.

2. The process of forming an expandable ceramic fiber felt comprising the steps of: dispersing about 80 to 98% of ceramic fibers and about 2 to 20% of expandable graphite flakes in water to form a slurry, said flakes having an average particle size from 0.5 to 2 millimeters, said percentages based on total dry weight percentage of the felt; adding an organic binder to the slurry, said binder softening at the temperature at which said ceramic felt begins to expand; allowing the organic binder to coagulate; and vacuum forming the slurry into a felt characterized by the presence of graphite flakes whose greater surface area is parallel to the orientated direction and perpendicular to the thickness direction of the ceramic fibers.

* * * * *

UNITED STATES PATENT AND TRADEMARK OFFICE
CERTIFICATE OF CORRECTION

PATENT NO. : 4,454,190
DATED : June 12, 1984
INVENTOR(S) : M. Katagiri

It is certified that error appears in the above-identified patent and that said Letters Patent are hereby corrected as shown below:

Column 2, line 41, delete "must" and insert therefor --can--.

Signed and Sealed this

Fifth Day of February 1985

[SEAL]

*Attest:*

DONALD J. QUIGG

*Attesting Officer*     *Acting Commissioner of Patents and Trademarks*